United States Patent

Ohmori et al.

[11] Patent Number: 5,974,012
[45] Date of Patent: Oct. 26, 1999

[54] RECORDING/REPRODUCING APPARATUS AND RECORDING MEDIUM ROTATION CONTROL METHOD

[75] Inventors: Takashi Ohmori, Tokyo; Eiji Tadokoro, Kanagawa, both of Japan

[73] Assignee: Sony Corporation, Tokyo, Japan

[21] Appl. No.: 08/907,039

[22] Filed: Aug. 6, 1997

[30] Foreign Application Priority Data

Aug. 20, 1996 [JP] Japan .................................. 8-218246

[51] Int. Cl.$^6$ ........................................ G11B 7/00
[52] U.S. Cl. ................................. 369/50; 369/124
[58] Field of Search ................ 369/50, 54, 58, 369/124, 44.32, 53

[56] References Cited

U.S. PATENT DOCUMENTS

| | | | |
|---|---|---|---|
| 5,304,907 | 4/1994 | Abe et al. | 318/611 |
| 5,467,331 | 11/1995 | Saiki et al. | 369/53 |
| 5,621,710 | 4/1997 | Koo | 369/50 |
| 5,627,805 | 5/1997 | Finkelstein et al. | 369/50 |
| 5,636,192 | 6/1997 | Shimizume et al. | 369/50 |
| 5,636,196 | 6/1997 | Kumagai | 369/50 |
| 5,663,942 | 9/1997 | Ishibashi et al. | 369/50 |
| 5,844,866 | 12/1998 | Fujimoto et al. | 369/50 |

FOREIGN PATENT DOCUMENTS

| | | |
|---|---|---|
| 0 310 250 | 4/1989 | European Pat. Off. . |
| 0 500 148 A2 | 8/1992 | European Pat. Off. . |
| 57-55512 | 4/1982 | Japan ........... 369/50 |
| 57-55567 | 4/1982 | Japan ........... 369/50 |
| 61-264551 | 11/1986 | Japan ........... 369/50 |
| 64-47155 | 2/1989 | Japan ........... 369/50 |

*Primary Examiner*—Nabil Hindi
*Attorney, Agent, or Firm*—Frommer Lawrence & Haug, LLP.; William S. Frommer

[57] ABSTRACT

An error voltage which includes serious fluctuation due to noise is applied to a LPF, and high frequency component due to noise is removed. The error voltage supplied through the LPF and a reference level, for example, 0-level voltage are supplied to a comparator. The comparator compares magnitude of theses two voltage each other, and outputs a signal which indicates polarity corresponding to the comparison result. As described herein above, by removing high frequency component included in the error voltage to be supplied to the comparator with the LPF, the polarity signal with reduced fluctuation due to noise and good quality can be obtained. Thus the polarity of an error voltage for controlling rotation of a disc can be judged correctly.

8 Claims, 8 Drawing Sheets

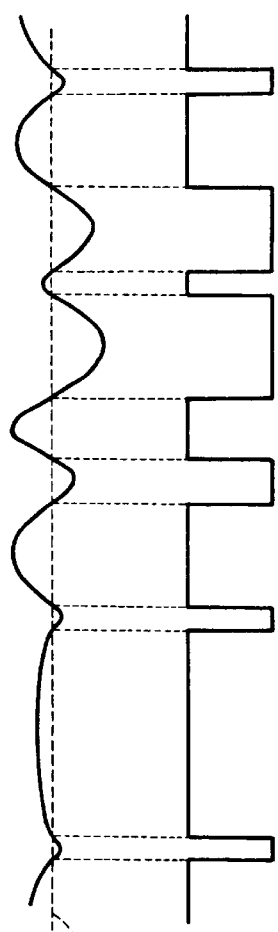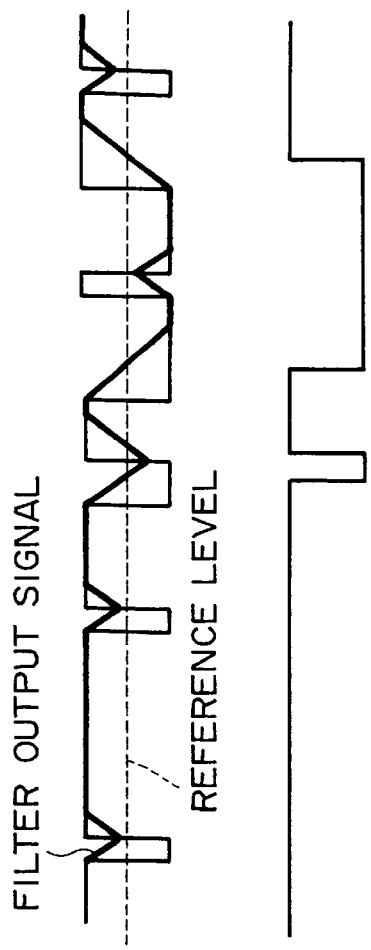
FIG. 4A INPUT SIGNAL / REFERENCE LEVEL
FIG. 4B BINARY SIGNAL
FIG. 4C FILTER OUTPUT SIGNAL / REFERENCE LEVEL
FIG. 4D OUTPUT SIGNAL

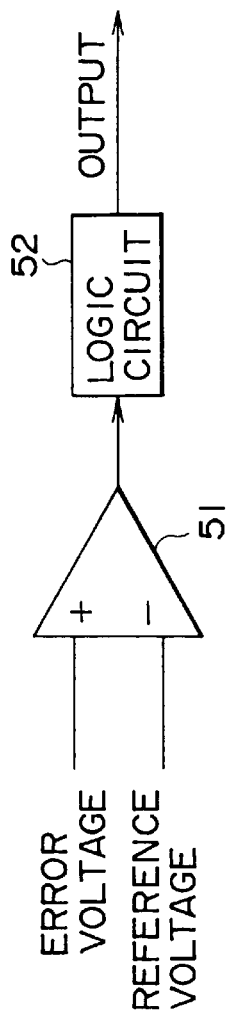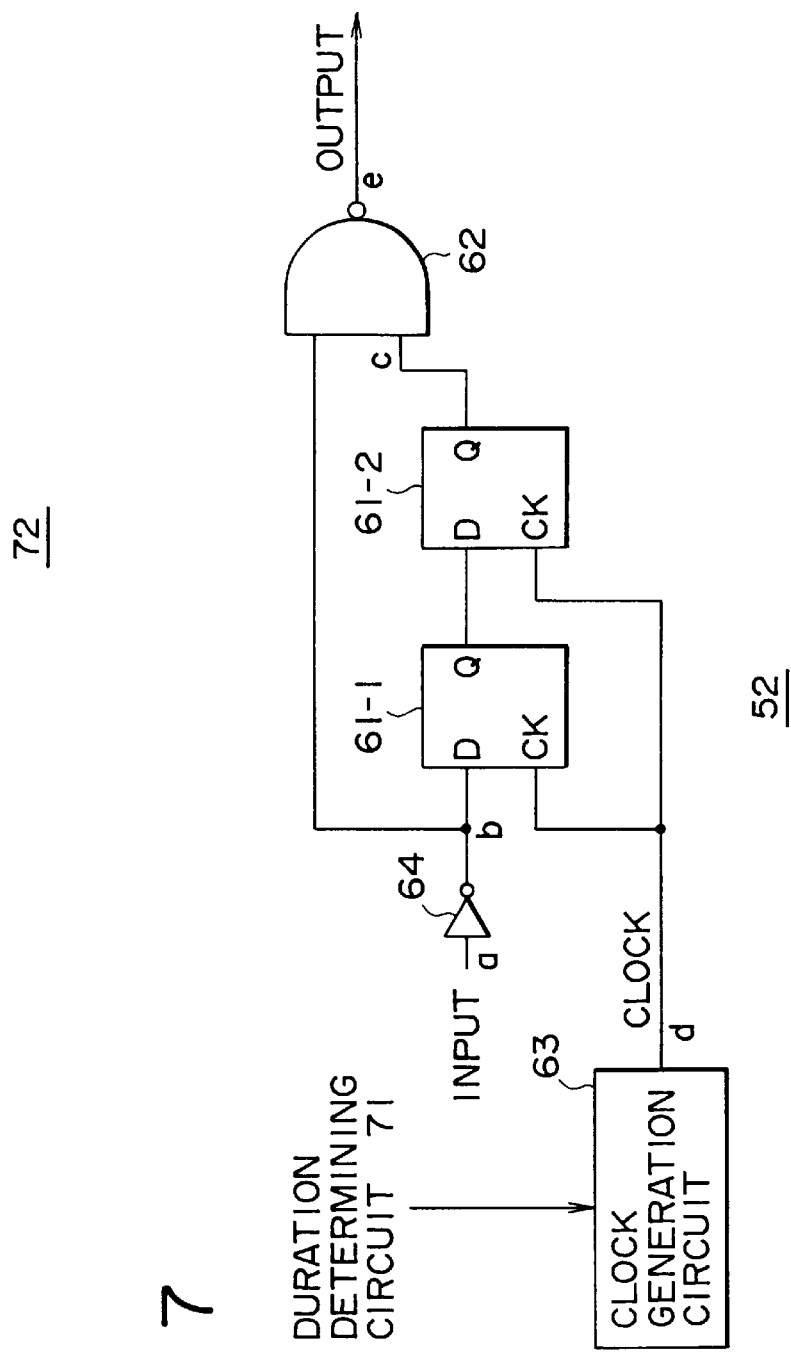
FIG. 6
FIG. 7

IN THE CASE OF CONTROL WITH RECORD SIGNAL ON A DISC

IN THE CASE OF CONTROL WITH WOBBLING SIGNAL ON A DISC

IN THE CASE OF CONTROL WITH RECORD SIGNAL
ON A DISC
F I G. 12A
ERROR VOLTAGE
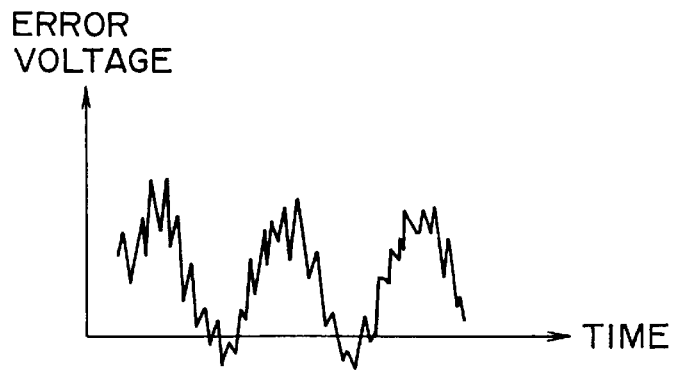
TIME
F I G. 12B
DIRECTION OF TORQUE
ACCELERATION
DECELERATION
IN THE CASE OF CONTROL WITH WOBBLING SIGNAL
ON A DISC
F I G. 13A
ERROR VOLTAGE
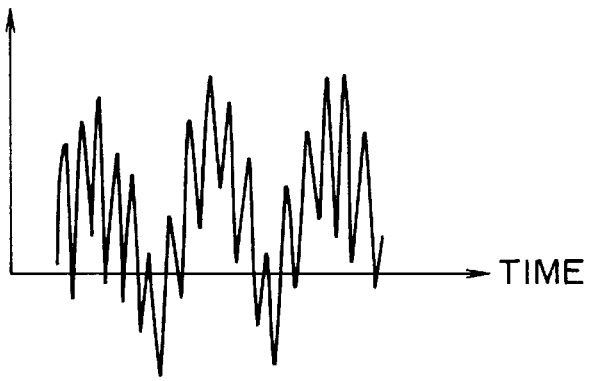
TIME
F I G. 13B
DIRECTION OF TORQUE
ACCELERATION
DECELERATION
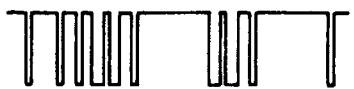

RECORDING/REPRODUCING APPARATUS AND RECORDING MEDIUM ROTATION CONTROL METHOD

BACKGROUND OF THE INVENTION

1. Field of the Invention

This invention relates to an apparatus for recording/reproducing and a method for controlling rotation of a recording medium, and more particularly relates to an apparatus for recording/reproducing a method for controlling rotation of a recording medium which are capable of reducing polarity fluctuation of error signals due to noise and performing accurately rotation control.

2. Description of Related Art

Heretofore, as the method for controlling rotation of a disc, two methods, which include a method that a rotation control signal is generated using a synchronizing signal of a signal recorded in a disc as data, and another method that a rotation control signal is generated using a reproducing signal from an address information recorded by wobbling of a track on a disc with a certain period, have been known.

In these rotation control methods, speed term data and phase term data at the irradiated position are generated based on the light reflected from a disc, and these data are synthesized to obtain an error voltage used for rotation control.

Polarity of the error voltage for indicating the rotation direction (acceleration or deceleration) of a disc and magnitude of the error voltage (absolute value) are obtained, and the signals of polarity and absolute value are synthesized and supplied to a certain spindle motor.

FIG. 9 shows an exemplary structure of a conventional polarity judgment circuit for judging polarity of an error voltage. In detail, an error voltage and a predetermined reference voltage are supplied to a comparator 1, and these two voltages are compared. A signal which indicates positive polarity (acceleration) is outputted if the error voltage is higher than the reference voltage, and a signal which indicates negative polarity (deceleration) is outputted if the error voltage is lower than the reference voltage.

FIG. 10 shows an error voltage for rotation control generated from a record signal on a disc. An error voltage is composed of a rotation variation voltage component which varies periodically every rotation, a certain constant loss voltage, and noise voltage having small amplitude.

On the other hand, FIG. 11 shows an error voltage generated from a wobble signal. Also in this case, though the error voltage is composed of rotation variation voltage, loss voltage, and noise components, fluctuation due to noise is more significant in comparison with the error voltage generated from a record signal shown in FIG. 10.

As it is apparent from FIG. 10 and FIG. 11, an error voltage includes always positive polarity (polarity of the direction which accelerates rotation). In detail, assuming that the reference voltage in FIG. 9 is 0, then the output from the comparator 1 shows always positive polarity corresponding to the error voltage input shown in FIG. 10 and FIG. 11.

In order to perform higher speed recording/reproducing processing of data, it is considered that rotation speed of a disc is increased to increase transfer speed of data.

FIG. 12A shows an error voltage generated from a record signal on a disc in the case that rotation speed is increased more faster than the case shown in FIG. 10. FIG. 12B shows polarity of the error voltage in such case. As shown in FIG. 12B, the increased rotation speed results in negative polarity, namely, generation of a voltage for deceleration.

FIG. 13A shows an error voltage generated from a wobble signal in the case of increased rotation speed. FIG. 13B shows polarity of the error voltage in such case. Inversion between positive polarity and negative polarity occurs more often in the case of FIG. 13B than in the case of FIG. 12B. The often inversion is attributed to error voltage fluctuation due to noise more significant in the case of FIG. 13 than in the case of FIG. 12.

Therefore, in the case that transfer speed is intended to be increased by rotating a disc faster, often inversion of polarity which arises along with judgment of polarity of the error voltage generated from a wobble signal results in loud deceleration noise and increased power consumption when decelerating, such noise and power consumption are problems.

SUMMARY OF THE INVENTION

The present invention was accomplished in view of such problems, it is the object of the present invention to provide a method for judging correctly the polarity of an error voltage in view of fluctuation elimination of an error voltage due to noise.

The recording/reproducing apparatus described in claim 1 is provided with a judgment means for judging polarity of an error voltage after fluctuation due to noise included in the error voltage is removed.

The recording/reproducing method described in claim 6 comprises a step for judging polarity of an error voltage after fluctuation due to noise included in the error voltage is removed.

In the recording/reproducing apparatus described in claim 1, the judgment means removes fluctuation due to noise included in an error voltage and then judges polarity of the error voltage.

In the recording medium rotation control method described in claim 8, fluctuation due to noise included in an error voltage is removed, and then polarity of the error voltage is judged.

BRIEF DESCRIPTION OF THE DRAWINGS

FIGS. 4A to 4D are a set of timing charts for describing processing operation of the polarity judgment circuit 22 in FIG. 2.

FIG. 6 is a block diagram for illustrating an exemplary structure of the polarity judgment circuit 72 in FIG. 5.

FIG. 7 is a block diagram for illustrating an exemplary structure of the logic circuit 52 in FIG. 6.

FIGS. 12A to 12B are a set of diagrams for illustrating an error voltage generated from a record signal on a disc during high speed rotation.

FIGS. 13A to 13B is a set of diagrams for illustrating an error voltage generated from a wobbling signal during high speed rotation.

DETAILED DESCRIPTION OF PREFERRED EMBODIMENTS

Before embodiments of the present invention are described, in order to describe clearly the correspondence relation between the respective means described in claims and embodiments described hereinafter, the feature of the present invention is described with addition of corresponding embodiment (one example) in parentheses subsequent to each means. Needless to say, such description does not limit the means to the embodiment in the parentheses.

The recording/reproducing apparatus described in claim 1 which controls rotation of a recording medium using a rotation control information recorded in a recording medium when the information is recorded in or reproduced from the recording medium, is provided with a generation means (for example, synthesis circuit 21 in FIG. 1) for generating an error voltage for rotating the recording medium from the rotation control information, a judgment means for judging polarity of the error voltage after removal of fluctuation due to noise included in the error voltage, a detection means (for example, absolute value circuit 23 in FIG. 23) for detecting magnitude of the error voltage, and a rotation means (for example, spindle motor 11 in FIG. 1) for rotating the recording medium dependently on the judged polarity of the error voltage and the detected magnitude of the error voltage.

Figure 1:
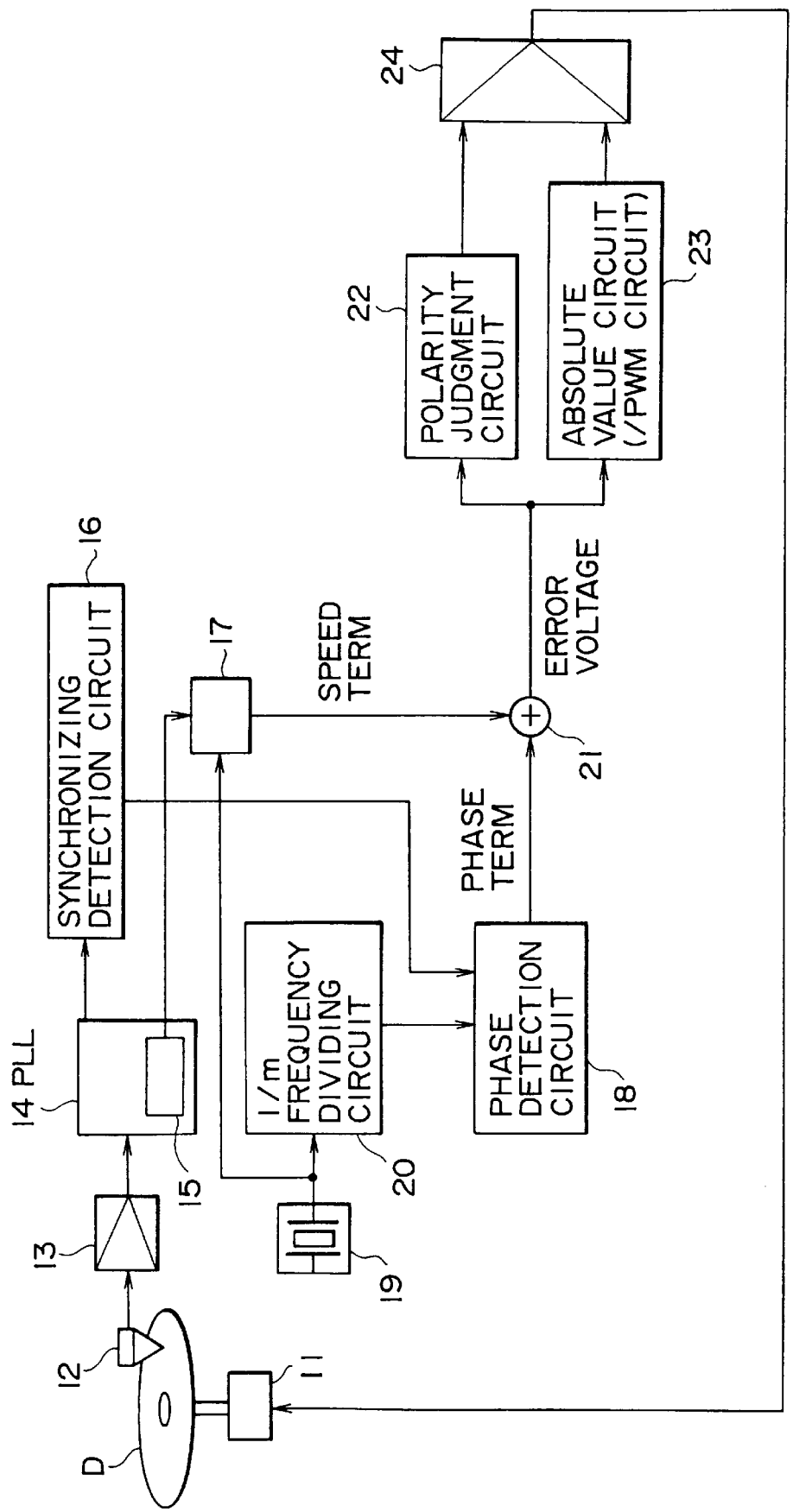
FIG. 1 is a block diagram for illustrating an exemplary structure of rotation control mechanism of a recording/reproducing apparatus of the present invention.

FIG. 1 is a block diagram for illustrating an exemplary structure of the rotation control mechanism of a recording/reproducing apparatus of the present invention.

An optical pick-up converts the reflected light from a disc D to a certain electric signal (reproducing signal). A reproducing signal of a wobbling signal corresponding to the track address outputted from the optical pick-up 12 is supplied to PLL 14 through a driver 13.

PLL 14 generates a synchronizing signal which locks the phase of a reproducing signal, and supplies it to a synchronizing detection circuit 16. A clock generation circuit 15 of PLL 14 generates a clock which synchronizes with the phase of the reproducing signal and outputs it to a length judgment circuit 17.

The synchronizing detection circuit 16 detects a synchronizing signal from the signal supplied from PLL 14 and outputs it to a phase detection circuit 18.

A quartz oscillator circuit 19 generates a clock having a predetermined frequency and outputs it to the length judgment circuit 17 and a 1/m frequency dividing circuit 20. The length judgment circuit 17 compares frequency of the clock supplied from the PLL 14 with that of the clock supplied from the quartz oscillator circuit 19 and calculates the speed term of the irradiated position, and outputs the speed term data to a synthesis circuit 21. The clock generated from the quartz oscillator circuit 19 is converted to a clock having a frequency of 1/m and supplied to the phase detection circuit 18. The synchronizing detection circuit 18 compares phase of the synchronizing signal supplied from the synchronizing circuit 16 with that of the clock supplied from the 1/m frequency dividing circuit 20 to detect the phase of the irradiated position, and outputs a phase term data to the synthesis circuit 21.

The synthesis circuit 21 combines the speed term data supplied from the length judgment circuit 17 with the phase term data supplied from the phase detection circuit 18 to generate an error voltage, and supplies it to a polarity judgment circuit 22 and absolute value circuit 23.

The polarity judgment circuit 22 judges whether polarity of the error voltage is the polarity which accelerates rotation speed of the disc (positive polarity) or the opposite polarity which decelerates rotation speed of the disc (negative polarity), and outputs the resultant polarity signal judgment to a driver 24.

The absolute value circuit 23 calculates the absolute value of the error voltage, and outputs the calculation result to the driver 24.

The driver 24 generates a rotation control signal using the polarity judgment result (polarity signal) of the error voltage and the absolute value, and supplies the rotation control signal to the spindle motor 11. The spindle motor 11 rotates the disc D dependently on the rotation control signal.

Figure 2:
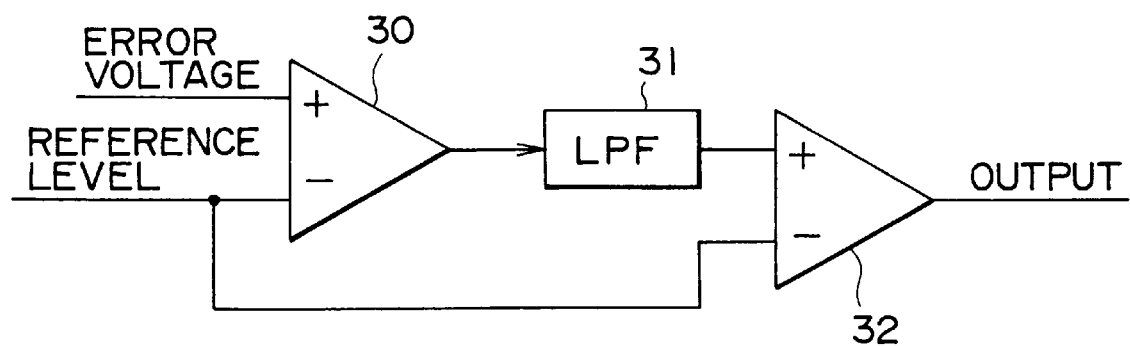
FIG. 2 is a block diagram for illustrating an exemplary structure of the polarity judgment circuit 22 in FIG. 1.

FIG. 2 is a block diagram for illustrating the exemplary structure of one example of the polarity judgment circuit 22. The error voltage generated in the synthesis circuit 21 is first supplied to a comparator 30 and is compared with the 0-level voltage (reference level), and a binary signal of positive polarity or negative polarity corresponding to the comparison result is supplied to a LPF 31 (low pass filter) of the polarity judgment circuit 22. The LPF 31 removes disturbance component generated due to noise from the signal and then the signal is supplied to a comparator 32.

The comparator 32 compares magnitude of the error voltage supplied from the LPF 31 with that of a predetermined reference voltage, for example, 0-level voltage, and a signal of positive polarity or negative polarity obtained dependently on the comparison result is supplied to the driver 24. In detail, if the error voltage supplied from the LPF 31 is higher than 0, then the comparator 32 supplies a signal of positive polarity to the driver 24, and if the error voltage is lower than 0, the comparator 32 supplies a signal of negative polarity to the driver 24.

Figure 3:
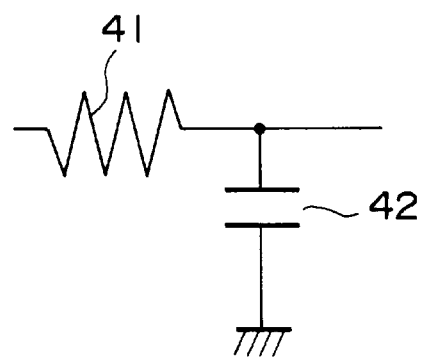
FIG. 3 is a circuit diagram for illustrating an exemplary structure of the LPF 31 in FIG. 2.

FIG. 3 is a circuit diagram for illustrating the structure of one example of the LPF 31. The error voltage supplied to the polarity judgment circuit 22 is applied to a resistor 41 of the LPF 31. Other end of the resistor 41 is connected to the one input side of the comparator 32 and also connected to the one terminal of a capacitor 42. The other end of the capacitor 42 is grounded. When a high frequency voltage is applied to the LPF 31, the capacitor 42 absorbs the voltage. Therefore, a low frequency component is outputted from the output terminal of the LPF 31.

Processing operation of the polarity judgment circuit 22 is described with reference to a timing chart shown in FIG. 4.

A binary signal (error voltage) shown in FIG. 4B is generated by comparing the input signal (FIG. 4A) with 0-level voltage (reference level) by means of the comparator 30. The binary signal is supplied to the LPF 31 of the polarity judgment circuit 22, the high frequency component of the input signal is removed in the LPF 31, and the signal having a waveform as shown in FIG. 4C is supplied to the comparator 32.

The comparator 32 compares the signal of the reference level (0-level signal) with the signal supplied from the LPF 31 (FIG. 4(c)), and generates a signal (FIG. 4D) which indicates polarity corresponding to the comparison result, and outputs it.

If the binary signal in FIG. 4A is supplied to the comparator 32 without passing through the LPF 31 (that is the case of a conventional polarity judgment circuit), a signal having the same waveform as the input signal is outputted. Therefore, it is apparent from the comparison of the signal of FIG. 4D (a signal in accordance with the present invention) with the same signal as that of FIG. 4B (a signal outputted from a conventional polarity judgment circuit) that high frequency component due to noise is removed from the former signal and frequency of polarity inversion is reduced, thus the former signal is better in signal quality than the latter signal.

Figure 5:
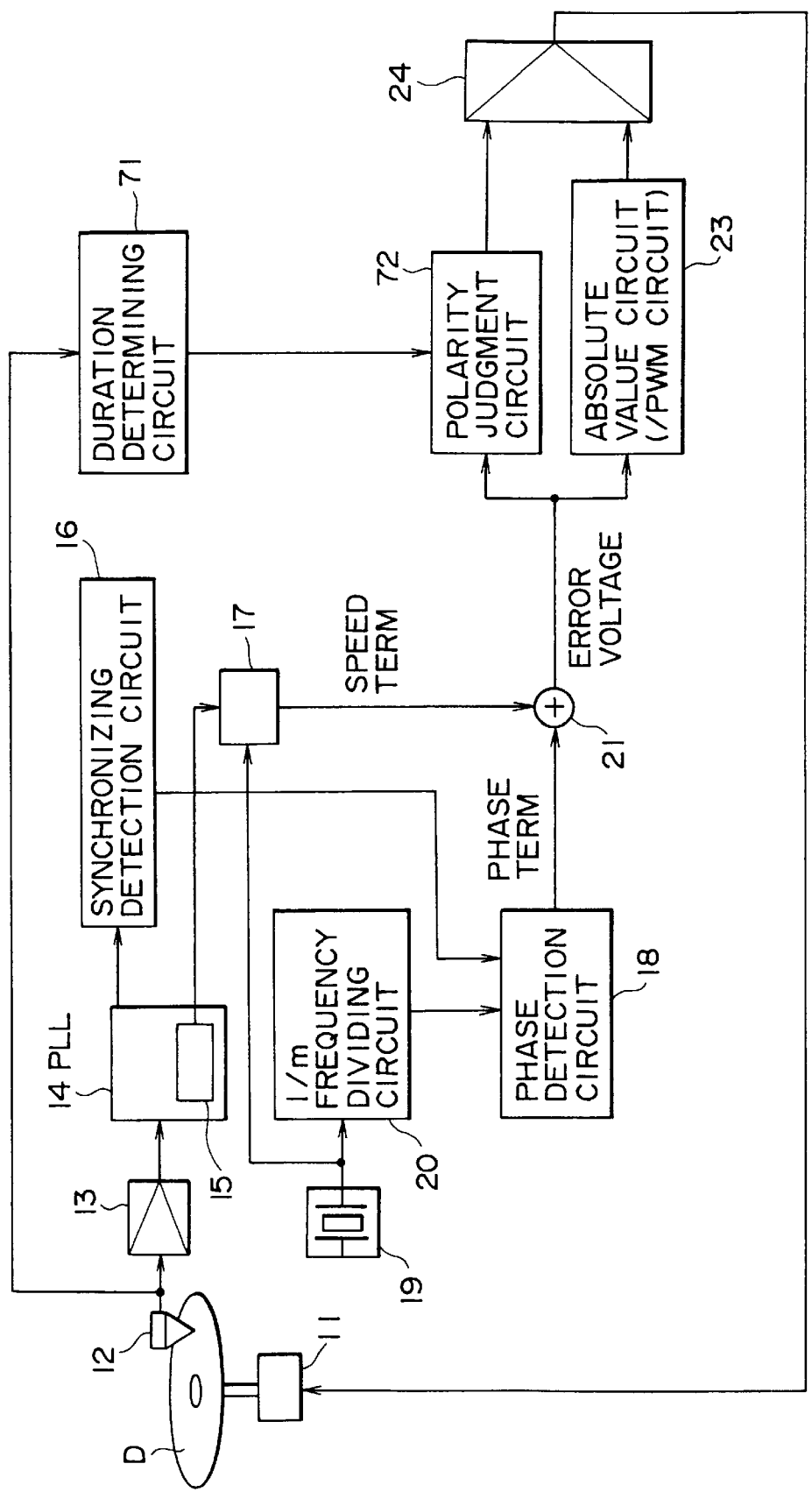
FIG. 5 is a block diagram for illustrating another exemplary structure of rotation control mechanism of a recording/reproducing apparatus of the present invention.

FIG. 5 shows the structure of another embodiment of a rotation control mechanism of a recording/reproducing apparatus in accordance with the present invention. Components in the recording/reproducing apparatus shown in FIG. 5 corresponding to components shown in FIG. 1 are given the same characters as shown in FIG. 1, and the description is omitted for convenience.

A duration determining circuit 71 judges the type of the disc using a signal supplied from the optical pick-up 12, also judges whether the operation is now recording processing or reproducing processing, determines a duration while the same polarity continues corresponding to the judgment result, and supplies the determined result to the polarity judgment circuit 72. In detail, for example, if the recording/reproducing apparatus is in reproducing processing, then the duration determining circuit 71 determines a relatively short duration so that the polarity judgment circuit 72 ignores a polarity change shorter than the determined duration. If the recording/reproducing apparatus is in recording processing, then the duration determining circuit 71 determines a relatively long duration so that the polarity judgment circuit 72 ignores a polarity change shorter than the determined duration. Thereby, high frequency component is ignored during reproduction, and high frequency component is reflected on recording with high fidelity during recording. As the result, noise due to deceleration generated when reproducing is suppressed and information is recorded with high fidelity to input signal when recording.

The polarity judgment circuit 72 controls the clock frequency which a built-in clock generation circuit 63 (FIG. 7) outputs corresponding to the determined result supplied from the duration determining circuit 71.

FIG. 6 is a block diagram for illustrating an exemplary structure of the polarity judgment circuit 72. The error voltage supplied from the synthesis circuit 21 is supplied to the one input terminal (non-inversion input) of a comparator 51 in the polarity judgment circuit 72. A certain predetermined reference voltage is supplied to the other input terminal (inversion input) of the comparator 51.

The comparator 51 compares the error voltage with the reference voltage, generates a signal which indicates polarity corresponding to the comparison result, and outputs it to a logic circuit 52. The logic circuit 52 extracts and outputs only the polarity signal that continued for a predetermined time using the frequency clock corresponding to the determined duration result supplied from the duration determining circuit 71.

FIG. 7 is a block diagram for illustrating an exemplary structure of the logic circuit 52. The clock generation circuit 63 generates a frequency clock corresponding to the determined duration result supplied from the duration determining circuit 71, and supplies it to the clock terminals CK of a D-type flip-flop 61-1 and a D-type flip-flop 61-2.

The input signal supplied from the comparator 51 is inverted in a NOT circuit 64, and thereafter supplied to the D-type flip-flop 61-1 and a NAND circuit 62. The output terminal Q of the D-type flip-flop 61-1 is connected to the input terminal D of the D-type flip-flop 61-2. The output terminal Q of the D-type flip-flop 61-2 is connected to the other input terminal of the NAND circuit 62.

Figure 8:
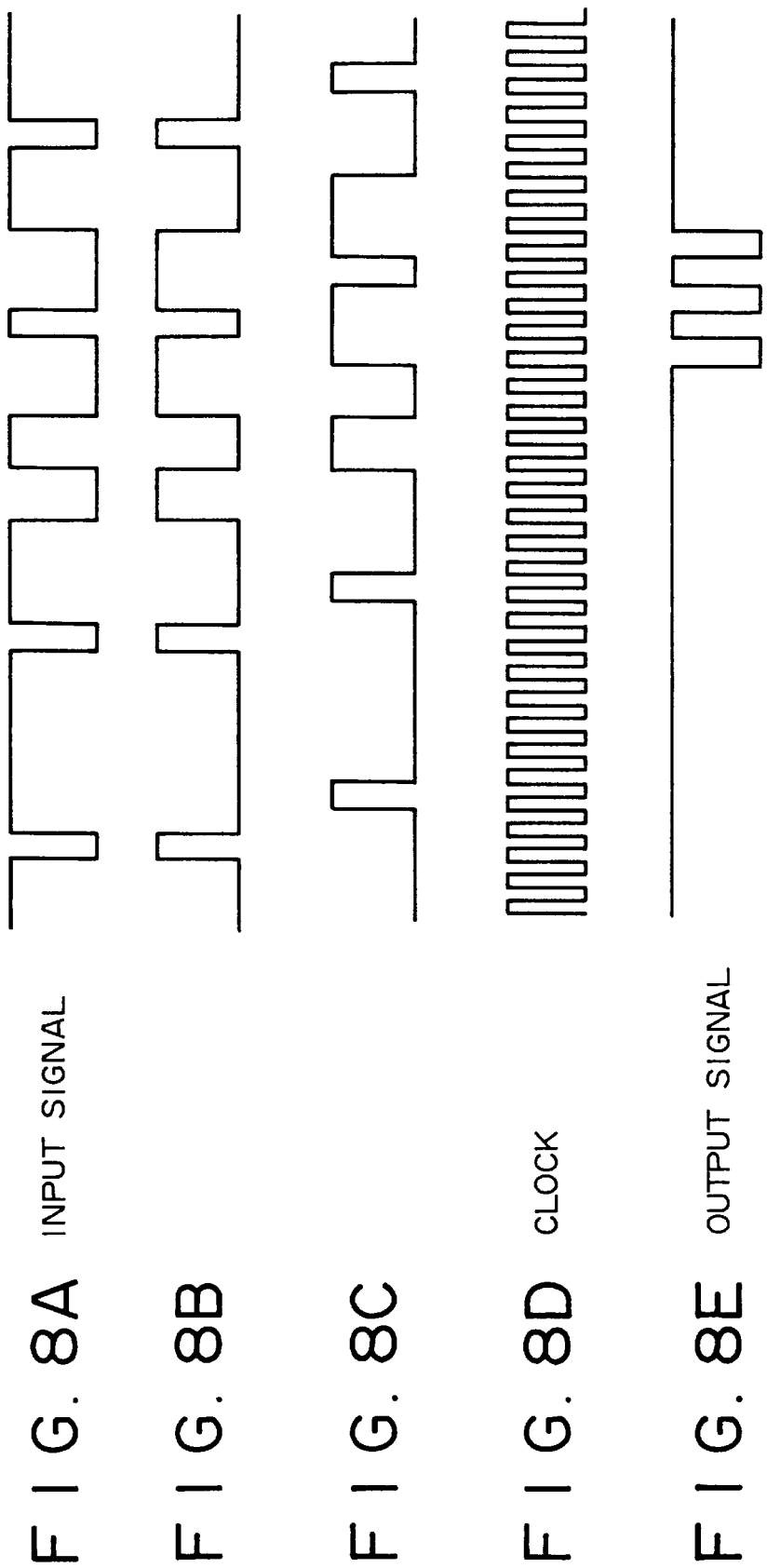
FIGS. 8A to 8E are a set of timing charts for describing processing operation of the logic circuit 52 in FIG. 7.

Processing operation of the logic circuit 52 is described with reference to a timing chart shown in FIG. 8.

The input signal (FIG. 8A) supplied from the comparator 51 is supplied to the NOT circuit 64 and inverted (FIG. 8B) and also the clock generation circuit generates a clock having a predetermined frequency (FIG. 8D) corresponding to the result determined by the duration determining circuit 71, and the clock is supplied to the clock terminals CK of the D-type flip-flop 61-1 and the D-type flip-flop 61-2.

The input signal (signal shown in FIG. 8B) inverted by the NOT circuit 64 and the two-clock delayed signal (FIG. 8C) supplied through the D-type flip-flops 61-1 and 61-2 are supplied to an input terminal of the NAND circuit 62. In detail, when both two-clock delayed signal and current signal are in H (high level), an output signal (FIG. 8E) outputted from the NAND circuit 62 is L.

As described herein above, high frequency polarization fluctuation due to noise can be removed. Because the clock frequency generated from the clock generation circuit 63 is controlled dependently on the operation of recording or reproducing, the frequency to be removed can be changed depending on the case.

Figure 9:
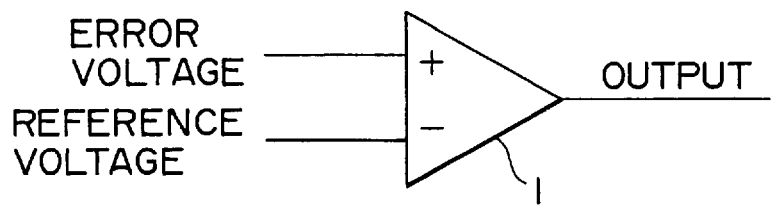
FIG. 9 is a block diagram for illustrating an exemplary structure of a conventional polarity judgment circuit.
Figure 10:
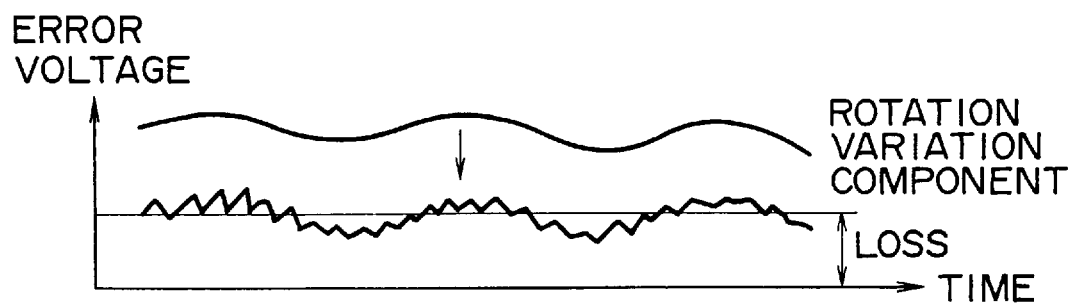
FIG. 10 is a diagram for illustrating an error voltage generated from a record signal on a disc.
Figure 11:
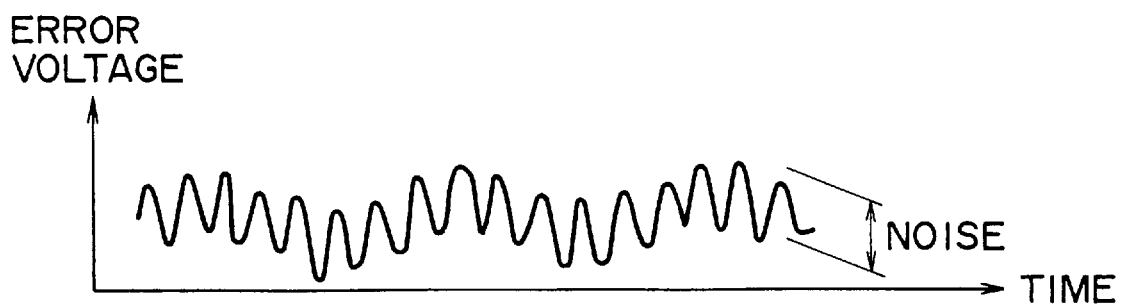
FIG. 11 is a diagram for illustrating an error voltage generated from a wobbling signal.

Alternately, in the case of a disc that the type of the disc is detected and the error voltage is generated from a wobbling signal, the polarity judgment circuit 22 or 72 as described herein above may be used, and in the case of a disc that the error voltage is generated from the recorded data, a conventional polarity judgment circuit as shown in FIG. 9 may be used. In the former case, through the servo band becomes somewhat narrow, thereby a wider servo band can be used.

According to a recording/reproducing apparatus described in claim 1 and a recording medium rotation control method described in claim 8, fluctuation due to noise included in the error voltage is removed and thereafter polarity of the error voltage is judged, thereby the polarity judgment of rotation control is performed adequately.

What is claimed is:

1. A recording/reproducing apparatus which controls rotation of a recording disc having tracks recorded thereon at a predetermined wobble frequency corresponding to modulated address information, comprising:

error generating means for generating an error signal in accordance with the modulated address information;

noise removing means for removing a noise component from the error signal;

polarity judgment means for determining polarity of said error signal after fluctuation due to noise included in said error signal is removed by the noise removing means;

detection means for detecting magnitude of said error signal from the error generating means; and rotation means for rotating said recording medium based on the determined polarity of said error signal and the detected magnitude of the error signal.

2. The recording/reproducing apparatus as claimed in claim 1, wherein said judgment means removes fluctuation due to said noise of said error voltage using a low pass filter.

3. The recording/reproducing apparatus as claimed in claim 1, wherein said judgment means compares the magnitude of said error voltage and a predetermined reference voltage, and removes fluctuation component due to said noise based on the difference between the signal with a delay of a predetermined time of the comparison result and the signal without delay of the comparison result.

4. The recording/reproducing apparatus as claimed in claim 1, wherein said judgment means changes fluctuation frequency to be removed depending on whether the operation is recording or reproducing.

5. The recording/reproducing apparatus as claimed in claim 1, wherein said judgment means changes fluctuation frequency to be removed depending on the type of said recording medium.

6. The recording/reproducing apparatus as claimed in claim 1, wherein said rotation means is provided with a spindle motor.

7. The recording/reproducing apparatus as claimed in claim 6, wherein said recording/reproducing apparatus is provided additionally a deceleration means for decelerating rotation of said spindle motor.

8. A recording medium rotation control method for controlling rotation of a recording disc having tracks recorded thereon at a predetermined wobble frequency corresponding to modulated address information, comprising the steps of;

generating an error signal in accordance with the modulated address information;

removing noise from said error voltage;

determining polarity of said error voltage after fluctuation due to noise included in said error voltage is removed;

detecting magnitude of said error signal; and rotating said recording medium based on the determined polarity of said error signal and the detected magnitude of said error signal.

* * * * *